US010700477B1

(12) United States Patent
Richardson et al.

(10) Patent No.: US 10,700,477 B1
(45) Date of Patent: Jun. 30, 2020

(54) MODULAR DEVICE BACKBONE FOR A NETWORK OF USER-SWAPPABLE PRODUCTS

(71) Applicant: Deako, Inc., Seattle, WA (US)

(72) Inventors: Derek Richardson, Seattle, WA (US); Patrick Prendergast, Clinton, WA (US); Kyle Montgomery, Seattle, WA (US)

(73) Assignee: Deako, Inc., Seattle, WA (US)

( * ) Notice: Subject to any disclaimer, the term of this patent is extended or adjusted under 35 U.S.C. 154(b) by 80 days.

(21) Appl. No.: 16/119,953

(22) Filed: Aug. 31, 2018

Related U.S. Application Data

(60) Provisional application No. 62/552,601, filed on Aug. 31, 2017.

(51) Int. Cl.
| | | |
|---|---|---|
| *H02J 3/14* | (2006.01) | |
| *H01R 13/66* | (2006.01) | |
| *H04L 29/08* | (2006.01) | |
| *G05F 1/565* | (2006.01) | |

(52) U.S. Cl.
CPC ......... *H01R 13/6683* (2013.01); *G05F 1/565* (2013.01); *H01R 13/6691* (2013.01); *H02J 3/14* (2013.01); *H04L 67/12* (2013.01); *H02J 2310/14* (2020.01)

(58) Field of Classification Search
CPC ........................................................ H02J 3/14
USPC ........................................................ 174/520
See application file for complete search history.

(56) References Cited

U.S. PATENT DOCUMENTS

| | | | |
|---|---|---|---|
| 10,063,002 B2 | 8/2018 | Richardson et al. | |
| 10,069,235 B2 | 9/2018 | Blase et al. | |
| 10,078,786 B2 | 9/2018 | Richardson et al. | |
| 10,153,113 B2 | 12/2018 | Richardson et al. | |
| 2014/0266669 A1* | 9/2014 | Fadell | G06N 5/04 340/501 |
| 2015/0156031 A1* | 6/2015 | Fadell | H04L 12/2816 700/276 |
| 2015/0276238 A1* | 10/2015 | Matsuoka | G05B 15/02 700/278 |
| 2017/0115649 A1 | 4/2017 | Richardson et al. | |

FOREIGN PATENT DOCUMENTS

WO   2017040729 A1   3/2017

* cited by examiner

*Primary Examiner* — Stanley Tso
(74) *Attorney, Agent, or Firm* — Suiter Swantz pc llo

(57) ABSTRACT

A modular device backbone includes two or more backplates configured to be distributed throughout a user space and further configured to couple with swappable devices. Each of the one or more backplates may include a configuration storage device to store configuration information for communicating with additional swappable devices coupled to additional backplates. Each of the one or more backplates may further include a communication unit to provide the configuration information to a coupled swappable device, where the coupled swappable device unit establishes a communication link to the additional swappable devices based on the configuration information.

18 Claims, 13 Drawing Sheets

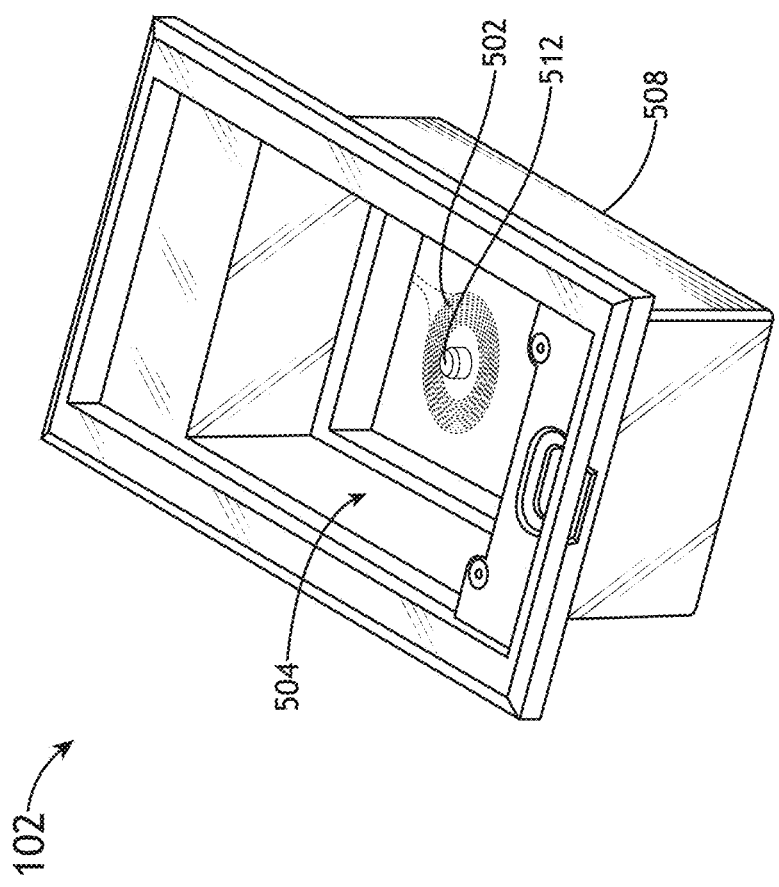

MODULAR DEVICE BACKBONE FOR A NETWORK OF USER-SWAPPABLE PRODUCTS

CROSS-REFERENCE TO RELATED APPLICATION

The present application claims the benefit under 35 U.S.C. § 119(e) of U.S. Provisional Application Ser. No. 62/552,601 filed Aug. 31, 2017, entitled MODULAR DEVICE BACKBONE FOR A NETWORK OF USER-SWAPPABLE PRODUCTS, which is incorporated herein by reference in the entirety.

TECHNICAL FIELD

The present disclosure relates generally to modular devices and, more particularly, to a configurable network of modular devices.

BACKGROUND

Products providing "smart" functionality or automation such as lighting, blinds, and thermostat control to name a few are rapidly gaining popularity in both home and commercial settings. However, current "smart" products or control systems require onerous installation and/or configuration steps that may provide a barrier to user adoption, limit the number of product features utilized once installed, or reduce the willingness of a user to upgrade or modify product use based on changing needs.

One of the most significant burdens on the user that may limit the willingness of a user to adopt, modify, or upgrade a product may be the physical installation requirements. In many cases, products providing "smart" functionality require a physical connection to one or more building systems such as the mains electrical network or a communication network such as a WiFi network, a Bluetooth Low Energy (BLE) network, or the like. For example, connecting to the mains electrical network of a building may require, at a minimum, turning off electrical power during installation. Often, however, connecting to a mains electrical network requires additional steps such as adding or modifying electrical boxes to accommodate a product or running new electrical wires to a desired location, which may further require removal and subsequent repair of drywall, repainting, or other finishing steps.

Further, once a product is successfully installed, it must typically be configured to perform desired functions or to integrate with additional products. For example, products may be configured to join a communication network (e.g. to enable monitoring or control). Additionally, products may be configured with contextual awareness (e.g. a lighting product may be configured as "kitchen lights").

Given these installation and configuration requirements, once a product is physically installed, users may be unwilling to reconfigure, modify, upgrade, or replace products based on changing needs, leading to system stagnation, decreased value to users, or system failures.

SUMMARY

A modular device backbone is disclosed in accordance with one or more illustrative embodiments of the present disclosure. In one illustrative embodiment, the modular device backbone includes two or more backplates configured to be distributed throughout a user space and further configured to couple with swappable devices. In another illustrative embodiment, each of the one or more backplates includes a configuration storage device to store configuration information for communicating with additional swappable devices coupled to additional backplates. In another illustrative embodiment, each of the one or more backplates includes a communication unit to provide the configuration information to a coupled swappable device, where the coupled swappable device unit establishes a communication link to the additional swappable devices based on the configuration information.

A modular device network is disclosed in accordance with one or more illustrative embodiments of the present disclosure. In one illustrative embodiment, the modular device network includes two or more backplates distributed throughout a user space and configured to couple with swappable devices. In another illustrative embodiment, each of the one or more backplates includes a configuration storage device to store configuration information for communicating with additional swappable devices coupled to additional backplates. In another illustrative embodiment, each of the one or more backplates includes a communication unit to provide the configuration information to a coupled swappable device. In another illustrative embodiment, the modular device network includes two or more swappable devices coupled to the two or more backplates, where each of the two or more swappable devices receives the configuration information from the corresponding backplate. In another illustrative embodiment, the two or more swappable devices establish a communication link between each other based on the configuration information.

A method for providing a modular device network is disclosed in accordance with one or more illustrative embodiments of the present disclosure. In one illustrative embodiment, the method includes mounting two or more backplates throughout a user space, where the two or more backplates are configured to couple with swappable devices. In another illustrative embodiment, each of the one or more backplates includes a configuration storage device to store configuration information for communicating with additional swappable devices coupled to additional backplates. In another illustrative embodiment, each of the one or more backplates includes a communication unit to provide the configuration information to a coupled swappable device. In another illustrative embodiment, the method includes coupling two or more swappable devices with the two or more backplates. In another illustrative embodiment, each of the two or more swappable devices receives the configuration information from the corresponding backplate. In another illustrative embodiment, the two or more swappable devices establish a communication link between each other based on the configuration information.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which:

FIG. 5A is an isometric view of a backplate including a backplate induction coil within a backplate cavity, in accordance with one or more embodiments of the present disclosure.

DETAILED DESCRIPTION

Figure 1:
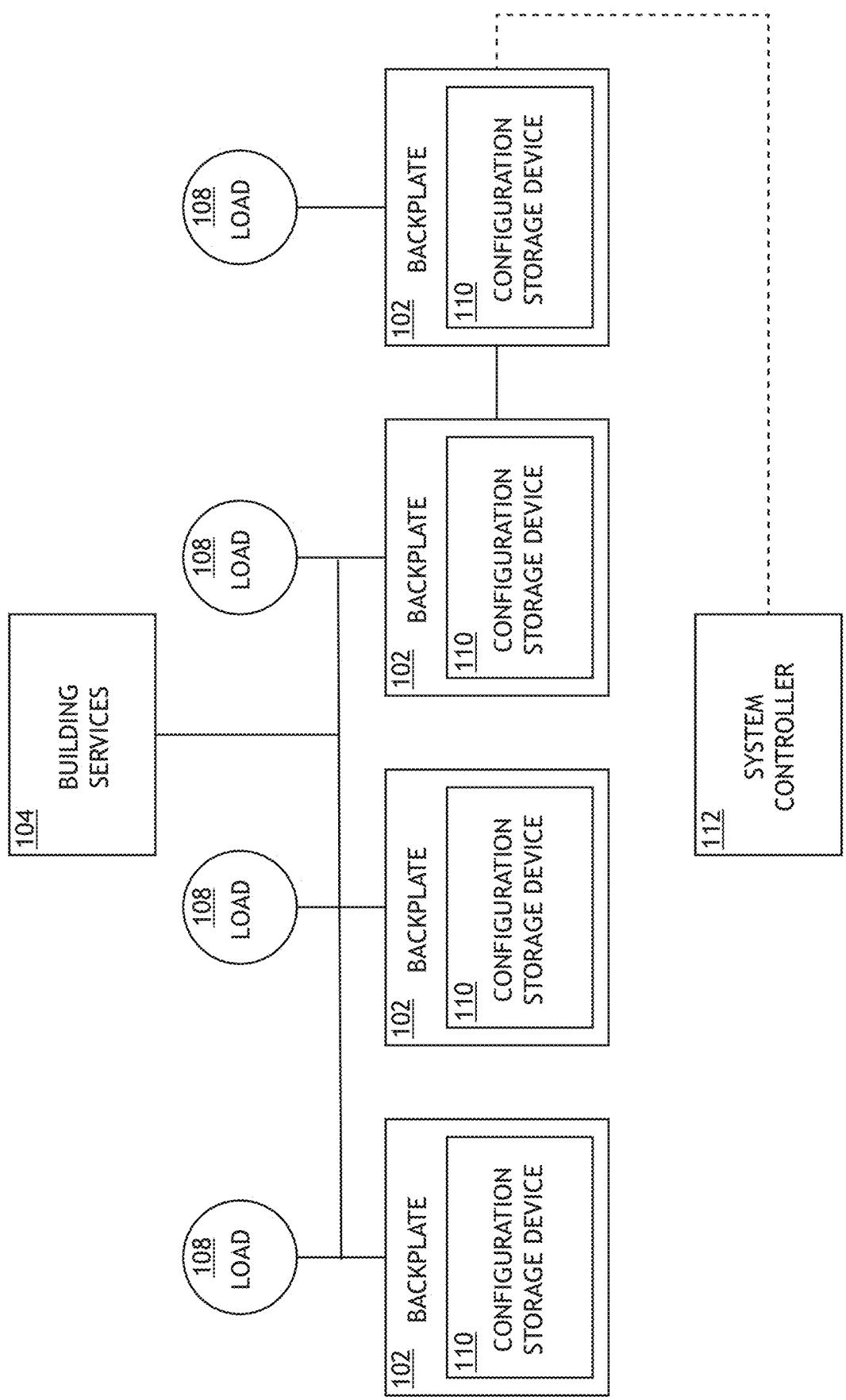
FIG. 1 is a conceptual view of a modular device backbone, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to systems and methods for providing a device configuration backbone for the installation and configuration of modular devices with varying levels of functionality. Such modular devices, for the purposes of the instant application, may include, but are not limited to, lights (e.g., recessed lights, can lights, surface mount lights, pendant lights, or the like), switches, user interfaces, control panels; sensors (e.g., occupancy, temperature, humidity, lighting, vibration, smoke, state (open/close), intrusion, security, flood/water); vents, shades, appliances, thermostats, gate and door openers/closers, plumbing fixtures and controls. For the purpose of the instant application "modular" means capable of connective interchangeable features between one module and another module wherein a module has at least some portion with a dimension sized and configured to be removably deployed in a system to add a feature. Further, "modular devices" means devices having different features capable of being interchangeably deployed in a system. Modular device controllers are generally described in U.S. patent application Ser. Nos. 15/253,811, 15/253,815, 15/253,819, 15/756,510, 15/145,624, 15/074,915, International Application No. PCT/US2016/049797, and U.S. Provisional Application No. 62/212,388, which are incorporated herein by reference in their entirety.

A modular device backbone for the connection of modular products may include a series of backplates (e.g. base units) suitable for coupling with swappable device units. The backplates may be physically installed at various selected locations of a building or user space and may further be physically connected to one or more building systems such as, but not limited to, the mains electrical network, a communication network, or a plumbing system. The backplates may further provide any combination of physical coupling (e.g. docking), power coupling, or communicative coupling with swappable device units. The swappable device units may include any type of product that provides a desired user function (e.g. lighting, lighting control, locks, sensors, HVAC control, plumbing, or the like). Further, the swappable device units and the backplates may be, but are not required to be, configured for rapid or toolless coupling. A user may thus install, remove, replace, rearrange, or upgrade swappable device units connected to the backbone by hand without traditional tools (e.g. screwdrivers, pliers, or the like). Once installed, the swappable device units may receive configuration information associated with the backbone from the backplates and self-configure without additional user input.

In some cases, swappable device units may include complete devices (e.g., lighting fixtures, fans, vents, blinds, or the like). In this regard, a user may swap complete devices to provide upgraded functionality and/or aesthetics. In some cases, swappable device units may include control units for installed devices. In this regard, a user may upgrade the functionality of a device without changing the aesthetics of the device. For the purposes of the present disclosure, descriptions, examples, or illustrations of swappable device units as complete devices or control units are provided solely for illustrative purposes and should not be interpreted as limiting and may interchangeably apply to complete devices or control units.

The backplates of a modular device backbone may be installed at any point during or after construction of the user space. For example, backplates may be installed during a construction phase of the user space (e.g. behind walls, within electrical junction boxes, or the like) to facilitate integration with building services with minimal disruption. It is recognized herein that building services such as power, communication, plumbing, and the like are typically distributed throughout a building during a pre-finishing construction phase such that the building services may be at least partially hidden from view (e.g. behind walls) during the finishing phase. Installation of backplates forming a modular device backbone may thus provide access to the building services at desired locations throughout the building. Swappable device units may then connect to the backplates to access the building services with any desired level of functionality. Accordingly, the modular device backbone may facilitate upgrading, replacing, or reconfiguring the swappable device units without demolition and/or refinishing work to access building services. For example, a user space may be constructed with the modular device backbone installed with a series of swappable device units with limited functionality (e.g. traditional manual light switches, light fixtures, and the like without network connectivity or remote-control functionality).

The backplates of a modular device backbone may further facilitate rapid and/or automatic configuration of installed swappable device units. For example, the modular device backbone may provide or otherwise point to configuration information to installed swappable device units. In this regard, the swappable device units may self-configure at least a portion of available functionality based on the configuration. In this regard, the user space may then be quickly and seamlessly upgraded with swappable device units with any desired level of functionality (e.g. network connectivity or remote-control functionality) without requiring manual configuration by the user.

FIG. 1 is a conceptual view of a modular device backbone 100, in accordance with one or more embodiments of the present disclosure. A modular device backbone 100 may include one or more backplates 102 suitable for distribution throughout a user space. For example, backplates 102 may be distributed throughout a single room, multiple rooms, multiple floors, multiple buildings, and/or throughout an outside space.

A backplate 102 associated with the modular device backbone 100 may be connected to one or more building services 104 through a system pathway 106 to provide access to building services 104 at any location. The building services 104 may be utilized by the backplates 102 themselves or passed through to a coupled swappable device unit. The building services 104 may include any type of infrastructure or systems suitable for distribution throughout the user space.

In some embodiments, the building services 104 connected to backplates 102 include mains power (e.g. alternating current (AC) power) provided to backplates 102 through a system pathway 106 including an electrical wiring system. It is recognized herein that an electrical wiring system of a building typically includes multiple electrical circuits to route electrical power from a power source (e.g. mains power) to multiple electrical junction boxes located throughout the building. Power cables containing electrical wires may be routed from a power distribution panel such as, but not limited to, an electrical fuse box, to the multiple electrical junction boxes. The electrical junction boxes may further facilitate electrical connections between the power distribution panel and one or more electrical devices (e.g. a switch, an outlet, a controller, or the like) by providing an enclosure in which the electrical devices may be connected to, or otherwise terminate, the electrical wires provided by the power cable. An electrical junction box may additionally provide structural support for mounting an electrical device.

In some embodiments, one or more backplates 102 of a modular device backbone 100 are directly connected to mains power via the electrical wiring system. For example, installation of backplates 102 during a construction phase may provide direct access to power cables connected to the power distribution panel. Accordingly, backplates 102 may be installed at any desired location in a user space (e.g. walls, ceilings, door/window frames, and the like) suitable for placement of a swappable device unit. In some embodiments, one or more backplates 102 of a modular device backbone 100 are mountable within electrical junction boxes and connect to power cables within the electrical junction boxes. In this regard, backplates 102 may be installed in any wired electrical junction box of a user space during a construction or post-construction phase. In some embodiments, one or more backplates 102 may pass electrical power to additional systems and may thus form a part of the electrical wiring network of a building. For example, as illustrated in FIG. 1, a first backplate 102a may be directly connected to building services 104 (e.g. including mains power) and may further pass the connection onto a second backplate 102b. In this regard, backplates 102 of a modular device backbone 100 may be arranged in a chained configuration (e.g., daisy-chained) to provide building services 104 to desired locations.

A backplate 102 may be configured to terminate a power cable with any number of conductors such as, but not limited to, a two-conductor power cable, a three-conductor power cable, or a four-conductor power cable. It is noted herein that backplates 102 may be compatible with any electrical wiring system in any configuration. For example, a backplate 102 may, but is not limited to, be configured to accept a wire connected to a ground source (e.g. a "ground" wire), a wire connected to a power source (e.g. a "hot" wire), a wire connected to a neutral bar (e.g. a "neutral" wire), or one or more additional wires (e.g. one or more "traveler" wires). Further, a backplate 102 may be configured to accept any gauge of wire (e.g. 12-gauge, 14-gauge, or the like).

In some embodiments, building services 104 connected to backplates 102 include direct current (DC) power suitable for light emitting diode (LED) lights and the like. For example, DC power may be provided directly from a power distribution panel or through AC-DC converters designed to convert AC power to DC power at a selected voltage.

In some embodiments, one or more backplates 102 are connected to loads 108 (e.g. luminaires, fans, appliances, or the like). In this regard, a backplate 102 may provide a path for the delivery of power to one or more loads 108. Further, backplates 102 may couple with (e.g. switches, dimmers, controllers, or the like) that may regulate power to the load through the connection provided by the backplate 102.

In some embodiments, building services 104 connected to backplates 102 of a modular device backbone 100 include communication services provided to the backplates 102 through a communication network. The communication network may be any type of wired or wireless communication network such as, but not limited to, a WiFi network, a BLE network, an Ethernet network, or a Powerline network. Accordingly, the communication network may facilitate communication between backplates 102 or between backplates 102 and an external network (e.g. the internet).

In some embodiments, a backplate 102 associated with the modular device backbone 100 includes a configuration storage device 110 for storing configuration information associated with the modular device backbone 100. The configuration storage device 110 may include any type of storage device suitable for storing configuration information such as, but not limited to, a non-volatile memory device. For example, the configuration storage device 110 may include a NAND flash device, a NOR flash device, or the like.

Configuration information stored in a configuration storage device 110 may include a unique backplate identifier suitable for identifying a particular backplate within the modular device backbone 100. By way of another example, configuration information may include location information. For instance, configuration information in a configuration storage device 110 may include a programmed location of a backplate 102 within a building (e.g. with respect to a floorplan, a three-dimensional (3D) model, or the like). In another instance, configuration information in a configuration storage device 110 may include a programmed location of a backplate 102 relative to other backplates 102 within the modular device backbone 100.

By way of another example, configuration information may include information associated with connected building services 104. For instance, configuration information for a backplate 102 connected to a communication service may include network protocols, security protocols, encryption protocols, and/or access codes for connecting to the communication service through the backplate 102. In another instance, configuration information for a backplate 102 connected to a power system (e.g. mains power) may include the number of wires connected to the backplate 102, connection information associated with the wires (e.g. whether they are "hot," "neutral," "ground," "traveler," or the like, electrical system limitations (e.g. a maximum current rating), information about loads (e.g. lights, appliances, or the like) connected to the backplate 102, or the like. Further, in the case that a backplate 102 is a part of a multi-gang electrical box, configuration information may specify the location of the backplate 102 within the multi-gang electrical box.

In some embodiments, the modular device backbone 100 includes a system controller 112 for providing control and/or management functions for any devices associated with the modular device backbone 100.

The system controller 112 may be any type of device suitable for controlling and/or managing devices associated with the modular device backbone 100. In some embodiments, the system controller 112 is a computing device (e.g. a locally-hosted computing device, a local hub, a remotely-hosted computing device, a "cloud-storage" system, or the like). In some embodiments, the system controller 112 is a backplate 102 associated with the modular device backbone 100.

In some embodiments, the system controller 112 stores and provides configuration information associated with the modular device backbone 100. For example, the configuration information stored by the system controller 112 may include configuration information stored on one or more configuration storage devices 110 of the backplates 102 (e.g. redundant information). By way of another example, the system controller 112 may include configuration information not stored on any configuration storage device 110 of any backplate 102. In this regard, the configuration information in a configuration storage device 110 of a backplate 102 may provide an address and/or a protocol to connect to the system controller 112 to retrieve additional configuration information. In this regard, a modular device backbone 100 including a system controller 112 may provide a central repository for configuration information that may facilitate easy management and may reduce the storage requirements of the backplates 102.

In some embodiments, the system controller 112 is communicatively coupled with one or more configuration storage devices 110 (e.g. via a system pathway 106 including a communication network). Accordingly, the system controller 112 may update configuration information stored in the configuration storage devices 110.

The modular device backbone 100 may facilitate the formation of a self-configuring network of swappable device units (e.g. a modular device network).

Figure 2:
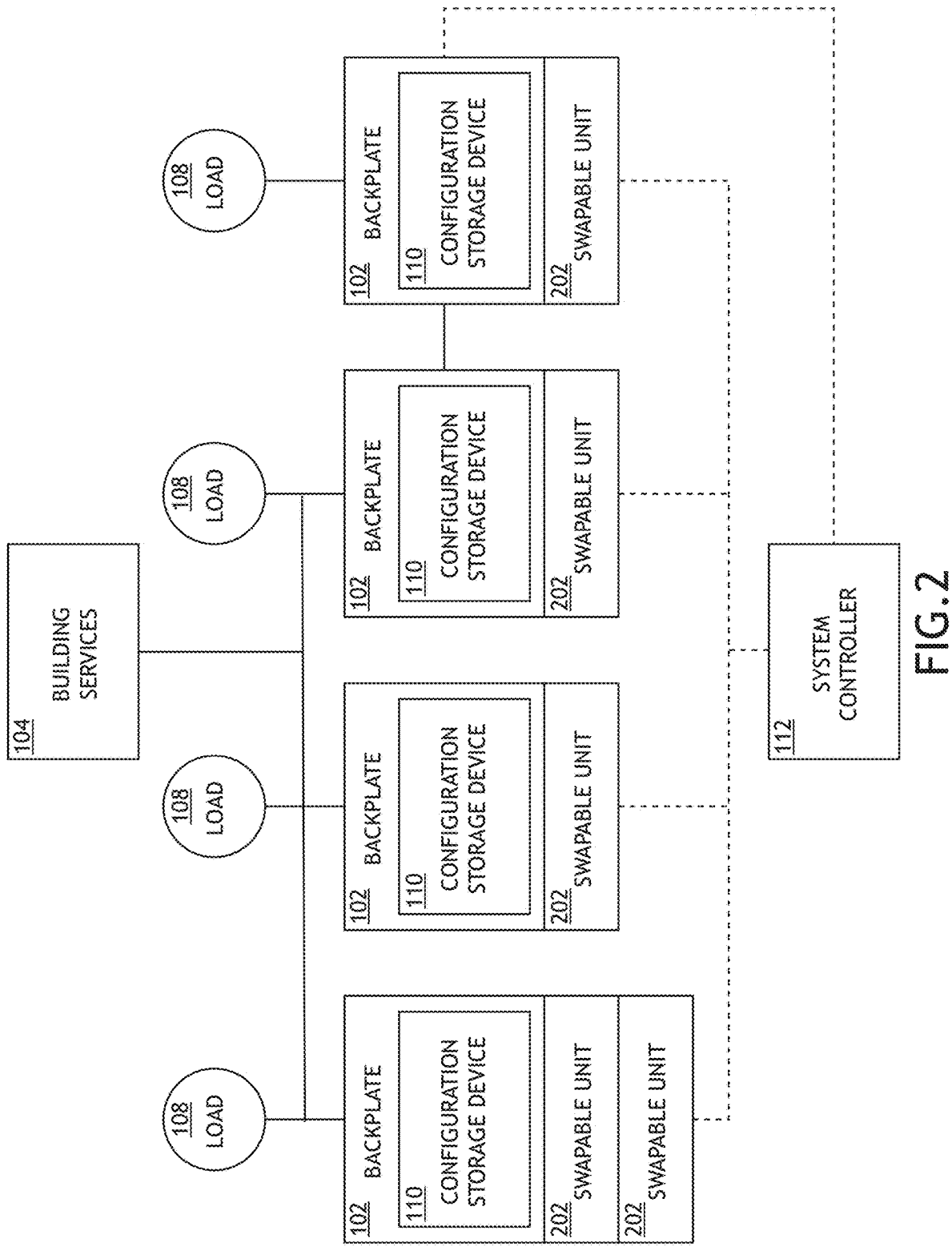
FIG. 2 is a conceptual view of a modular device network including swappable device units coupled with backplates of a modular device backbone, in accordance with one or more embodiments of the present disclosure.

FIG. 2 is a conceptual view of a modular device network 200 including swappable device units 202 coupled with backplates 102 of a modular device backbone 100, in accordance with one or more embodiments of the present disclosure. In some embodiments, swappable device units 202 may be removably and interchangeably coupled (e.g. communicatively and/or physically) with backplates 102 and may self-configure based on configuration information of the modular device backbone 100 provided by the backplates 102. Accordingly, swappable device units 202 associated with the modular device backbone 100 may be communicatively coupled such that the status and/or functions of one swappable device unit 202 may be read and/or controlled by other swappable device units 202 associated with the modular device backbone 100. The modular device backbone 100 may thus provide a backbone for the modular device network 200 for automated and/or remote control of the swappable device units 202 as well as any loads 108 attached to the swappable device units 202.

For example, a swappable device unit 202, upon coupling with a backplate 102, may receive configuration information including networking, security, or encryption protocols for starting a new modular device network 200 or joining an existing modular device network 200 using encryption if available. In one instance, the swappable device unit 202 retrieves the configuration information from the backplate 102. In another instance, the swappable device unit 202 retrieves configuration information from an additional computing device (e.g. the system controller 112, a remote server, or the like) based on data retrieved from the backplate 102 (e.g. a unique backplate ID, encryption information, an address of the additional computing device, or the like).

Further, the swappable device unit 202 may receive configuration information including location information, electrical wiring connections, limitations of the electrical network, attached loads, the presence and/or locations of other swappable device units 202, or the like without requiring user input. Additionally, the swappable device unit 202 may broadcast its presence on the modular device network 200 such that other swappable device units 202 may be aware. Accordingly, the swappable device unit 202 may, after a suitable configuration time, provide relevant information to the user (e.g. on a display) or may enable remote control of features or connected loads 108 by other devices on the modular device network 200 without requiring user configuration.

In some embodiments, the installation of a new swappable device unit 202 as well as associated connections, connected loads, device functionality, and the like may be recorded as configuration information in the system controller 112 and/or within a configuration storage device 110 of one or more backplates 102. Similarly, upon decoupling from a backplate 102, the configuration information across the modular device network 200 may be removed to reflect the removal of a swappable device unit 202. Further, various remaining swappable device units 202 may reconfigure accordingly (e.g., without user input) such that a user is provided options and/or display information corresponding to swappable device units 202 on the modular device network 200. A user may thus install, add, subtract, replace, update, or upgrade swappable device units 202 from the modular device network 200 by coupling or decoupling swappable device units 202 with desired functionality into backplates 102 of the modular device backbone 100.

In some embodiments, the coupling or decoupling of a swappable device unit 202 to a backplate 102 may be logged to provide a record of changes to the modular device network 200 associated with the modular device backbone 100. The log information may be stored on any device within the modular device network 200 (e.g. one or more of the swappable device units 202 or the system controller 112) or transmitted to an external computing device (e.g. a remote server). In some embodiments, a log of changes to the modular device network 200 may be utilized to automatically generate payments and/or charges associated with continued use of the modular device backbone 100. For example, an installer, operator, or owner of the modular device backbone 100 may receive payments based on the number of times a user adds, removes, rearranges, or replaces swappable device units 202.

In some embodiments, a backplate 102 provides a physical platform (e.g. a dock) for receiving swappable device units 202. For example, a backplate 102 may include features such as, but not limited to, a cavity for receiving a swappable device unit 202, a locking mechanism to secure the swappable device unit 202, contacts for the transfer of electrical power and/or for a wired communication pathway, and a release mechanism for the removal (e.g. toolless removal) of the swappable device unit 202 by a user. Further, a modular device network 200 may include different types of backplates 102 having different physical and/or electrical features suitable for coupling with different types of swappable device units 202 as well as for mounting within different areas of a user space. For example, a backplate 102 may have physical and/or electrical characteristics suitable for coupling to swappable device units 202 configured as device controllers (e.g., switches, dimmers, control panels, or the like) and may further be shaped to mount to rectangular electrical junction boxes. By way of another example, a backplate 102 may have physical and/or electrical characteristics suitable for coupling to swappable device units 202 configured as ceiling fixtures (e.g., light fixtures, ceiling fans, or the like) and may further be shaped to mount to circular electrical junction boxes.

Figure 3:
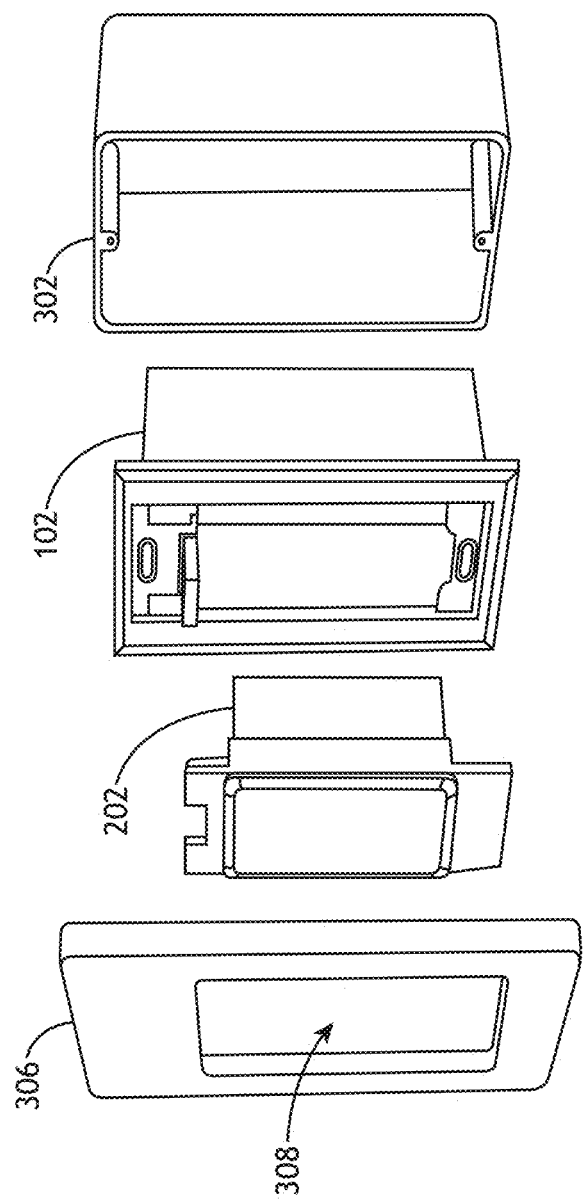
FIG. 3 is an exploded view of a backplate configured to mount within an electrical junction box, and an interchangeable swappable device unit configured to removably mount within the backplate, in accordance with one or more embodiments of the present disclosure.
Figure 4:
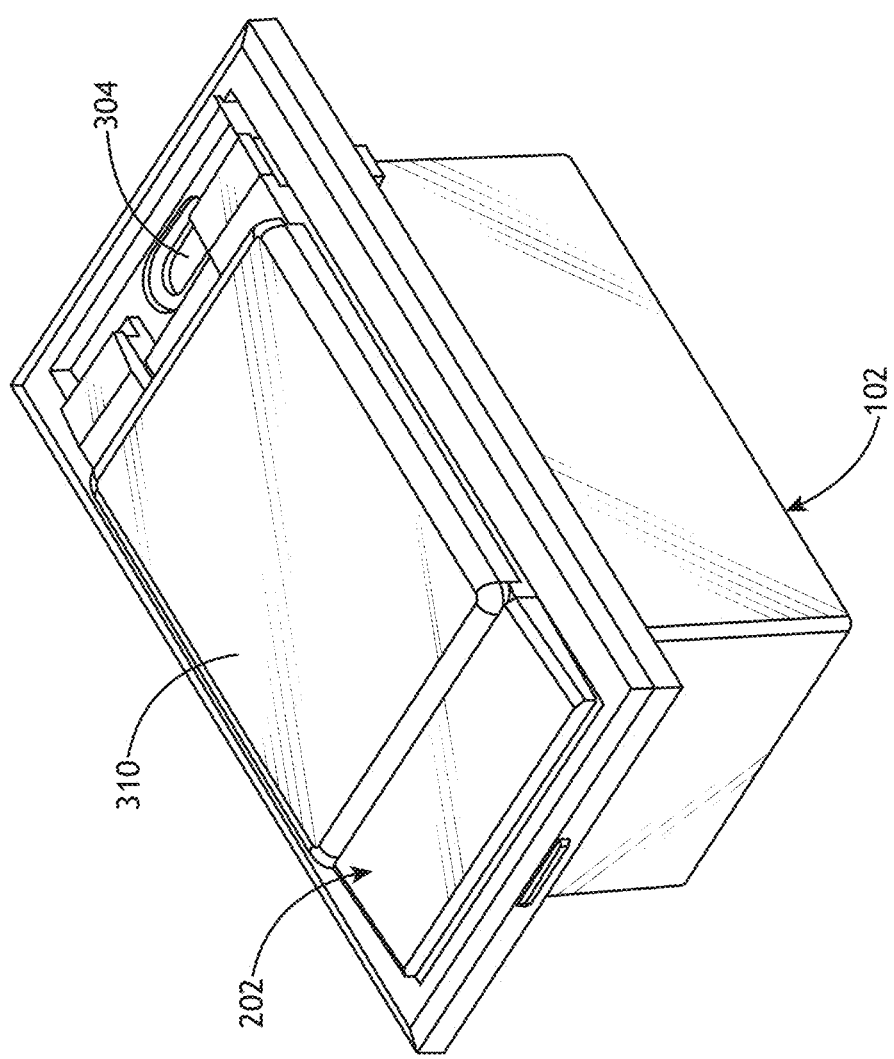
FIG. 4 is an isometric view of a backplate physically coupled with a swappable device unit, in accordance with one or more embodiments of the present disclosure.

FIG. 3 is an exploded view of a backplate 102 configured to mount within an electrical junction box 302 (e.g., a rectangular junction box suitable for housing device controllers such as switches, dimmers, outlets, or the like), and an interchangeable swappable device unit 202 configured to removably mount within the backplate 102, in accordance with one or more embodiments of the present disclosure. FIG. 4 is an isometric view of a backplate 102 physically coupled with a swappable device unit 202, in accordance with one or more embodiments of the present disclosure. Physical and electrical coupling between backplates and device controllers is generally described in U.S. patent application Ser. Nos. 15/253,811, 15/253,815, 15/253,819, 15/756,510, 15/145,624, 15/074,915, International Application No. PCT/US2016/049797, and U.S. Provisional Application No. 62/212,388, which are all incorporated herein in their entirety.

In some embodiments, the backplate 102 is configured to mount within the electrical junction box 302 (e.g. through a mounting screw opening 304) and may connect to mains power through a power cable (not shown) routed to the electrical junction box 302. The swappable device unit 202 may be secured into the backplate 102 (e.g. docked) to receive configuration information from the configuration storage device 110 within the backplate 102 through wired or wireless communication. Further, a faceplate 306 having an opening 308 for a portion of the swappable device unit 202 (e.g. a display 310). In this regard, a backplate 102 may provide a standardized mounting assembly for swappable device unit 202 suitable for placement in an electrical junction box 302. Further, swappable device units 202 may be interchangeably connected to the electrical wiring system through the backplate 102.

In some embodiments, the backplate 102 may provide connections to mains power to a docked swappable device unit 202 through one or more electrical contacts (not shown). In this regard, the swappable device unit 202 may utilize and/or regulate mains power. For example, the swappable device unit 202 may include one or more loads 108 and may thus draw mains power. By way of another example, the swappable device unit 202 may utilize mains power to perform one or more functions (e.g. power a display, power lights, perform processing steps, power communication circuitry for communication with other swappable device units 202, on an internal processor, or the like). By way of another example, the swappable device unit 202 may include a device controller to regulate power to one or more connected loads 108 (e.g. luminaires, fans, appliances, or the like). In this regard, the swappable device unit 202 may operate as a switch (e.g. a toggle switch, a dimmer switch, or the like) to regulate connected loads 108 or as multi-function controller by controlling of multiple loads 108 connected to additional swappable device units 202 (e.g. by directing an additional swappable device unit 202 to regulate power to a connected load 108.

In some embodiments, a swappable device unit 202 may be inserted into or removed from a backplate 102 while a backplate 102 is connected to live power from the electrical wiring assembly. In this regard, swappable device units 202 may be "hot-swappable" such that a user may insert or remove a swappable device unit 202 from a backplate 102 connected to "live" power (e.g. without turning off power at a power distribution panel). For example, an electrical connection established between a backplate 102 and a swappable device unit 202 may be configured to establish a ground connection prior to establishing a "hot" wire connection to mitigate arcing during insertion or removal.

It is to be understood that the illustration of a backplate 102 configured to mount within a rectangular electrical box typically used for light switches and the like is provided merely for illustrative purposes and should not be interpreted as limiting. A backplate 102 may be configured to mount within any type of electrical junction box such as, but not limited to a light fixture junction box suitable for mounting light fixtures in a ceiling. In some embodiments, a backplate 102 may obviate the need for a separate electrical junction box and may be directly secured to a building structure (e.g. a stud, a joist, or the like). Further, a backplate 102 may provide fire-resistance (e.g., for one or more swappable device units 202, or the like). For example, a backplate 102 may be compliant with selected Underwriters Laboratories (UL) codes for fire ratings. In one instance, a backplate 102 may be, but is not required to be, compliant with a 1 hour UL fire rating, a 2 hour UL fire rating, or the like. Accordingly, a backplate 102 may be formed from any material suitable for providing a selected level of fire resistance such as, but not limited to metals, fiberglass, and the like.

In some embodiments, a backplate 102 may provide a magnetic mount for hidden mounting of a swappable device unit 202. For instance, a backplate 102 may be installed behind an object (e.g. a wall, a ceiling, a floor panel, or the like) and may include a magnet sufficiently strong to couple with a corresponding swappable device unit 202 through the object.

In some embodiments, a backplate 102 is not configured to be in physical contact with a swappable device unit 202. For example, a backplate 102 may be configured to be placed in a central location (e.g. on a table, behind a wall, above a ceiling, under a floor, or the like) suitable for communication with multiple swappable device units 202. Accordingly, the multiple swappable device units 202 may receive configuration information from a single backplate 102.

In some embodiments, a backplate 102 of the modular device backbone 100 includes communication components to facilitate communication between the backplate 102 and corresponding communication components within one or more swappable device units 202 for the transmission and/or reception of configuration information. The communication components may implement any type of communication protocol suitable for transferring data between a backplate 102 and a swappable device unit 202. For example, the communication components may implement wired communication (e.g. through physical contacts between a backplate 102 and a coupled swappable device unit 202). By way of another example, the communication components may include one or more antennas for wirelessly transmitting data between a backplate 102 and a swappable device unit 202.

Figure 5B:
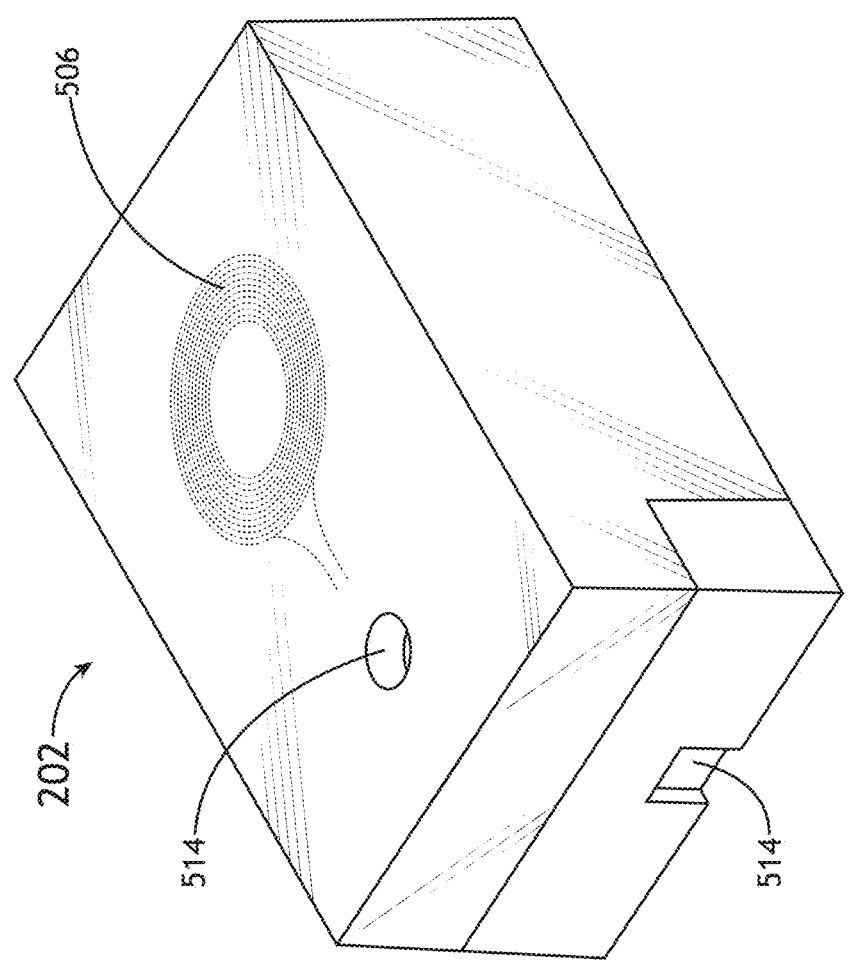
FIG. 5B is an isometric view of a back side of a swappable device unit including a device induction coil for coupling with the backplate induction coil, in accordance with one or more embodiments of the present disclosure.

In some embodiments, a communication component may include one or more induction coils for wireless data and/or power transfer. FIG. 5A is an isometric view of a backplate 102 including a backplate induction coil 502 within a backplate cavity 504, in accordance with one or more embodiments of the present disclosure. FIG. 5B is an isometric view of a back side of a swappable device unit 202 including a device induction coil 506 for coupling with the backplate induction coil 502, in accordance with one or more embodiments of the present disclosure. Accordingly, the backplate induction coil 502 may be suitable for the transmission of data (e.g. configuration data from the configuration storage device 110) and/or electrical power to a nearby device induction coil 506 of a coupled swappable device unit 202.

In some embodiments, the backplate induction coil 502, shown in dotted lines in FIG. 5A, is located underneath the surface of a casing 508 (e.g. attached to a front plate via fasteners 510) of the backplate 102 near the cavity 504. In this regard, the backplate induction coil 502 may not be exposed to and may thus not be accessible through the cavity 504. Similarly, in some embodiments, the device induction coil 506, shown in dotted lines in FIG. 5B, is located underneath the surface of the casing 508 of the swappable device unit 202. Further, the backplate induction coil 502 and the device induction coil 506 may be aligned when the swappable device unit 202 is inserted into the backplate 102 such that data and/or electrical power may be transferred via inductive coupling. For example, the backplate may include a backplate keyed feature 512 that couples with a device keyed feature 514 when a swappable device unit 202 is properly aligned in a backplate 102. In addition, electrical components of the backplate 102 and/or the swappable device unit 202 may be shielded regardless of whether a swappable device unit 202 is inserted into a backplate 102.

Figure 6A:
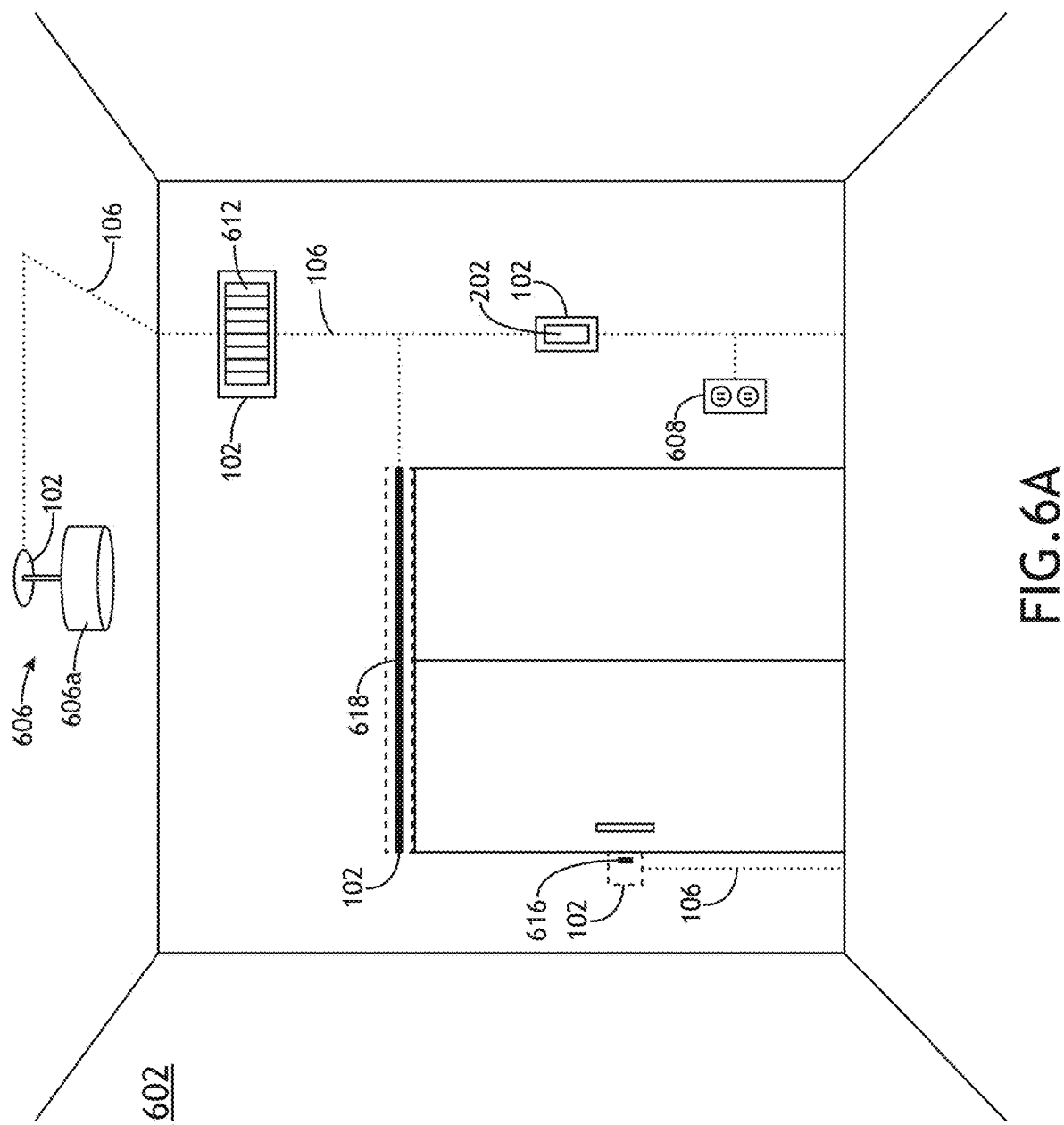
FIG. 6A is a conceptual view of exemplary swappable device units and corresponding backplates distributed throughout a first room of a user space, in accordance with one or more embodiments of the present disclosure.
Figure 6B:
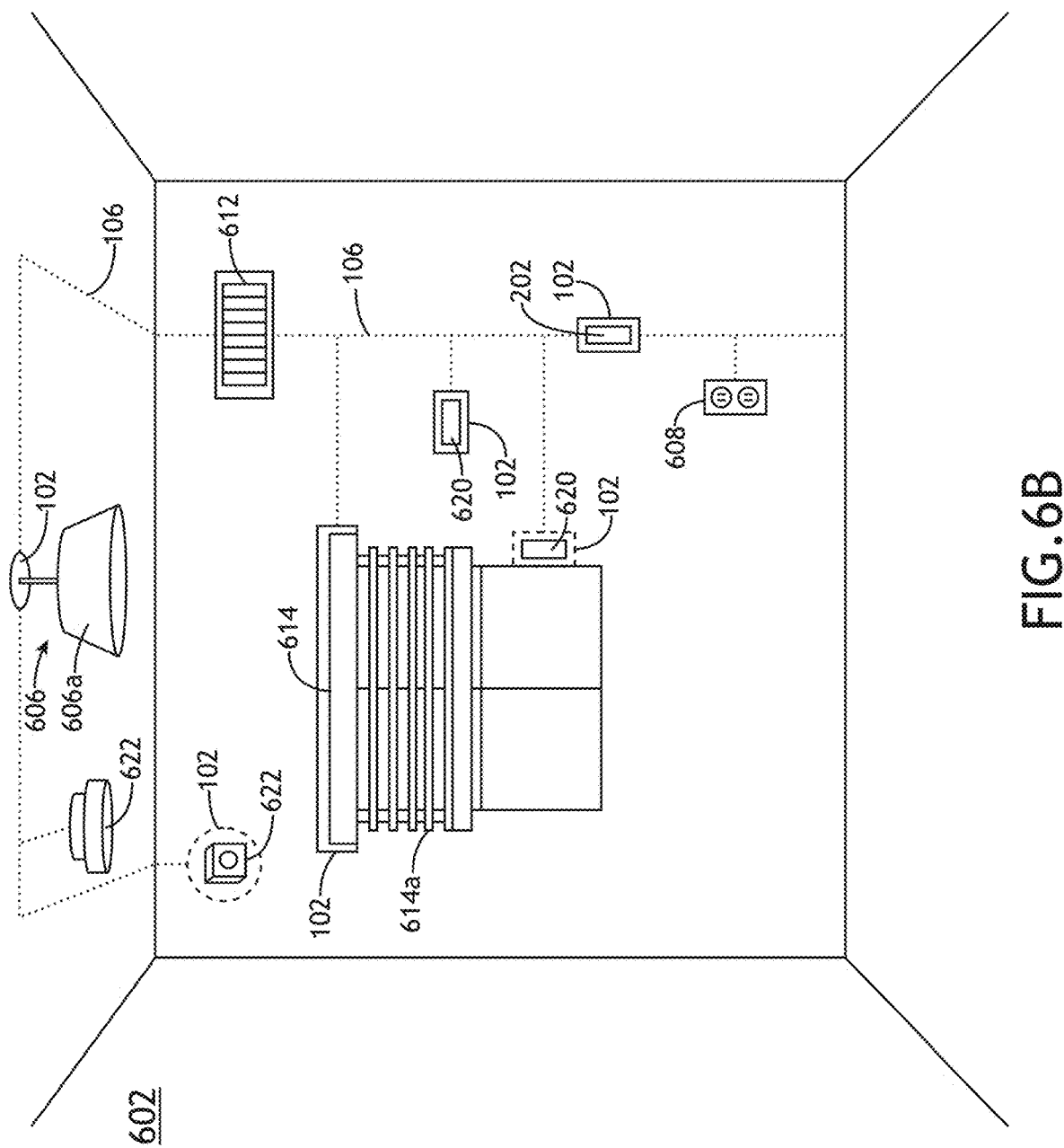
FIG. 6B is a conceptual view of exemplary swappable device units and corresponding backplates distributed throughout a second room of a user space, in accordance with one or more embodiments of the present disclosure.

A swappable device unit 202 may include any type of product providing a user function suitable for integration with a corresponding backplate 102. FIGS. 6A and 6B are conceptual views of exemplary swappable device units 202 and corresponding backplates 102 distributed throughout a first room 602 and a second room 604 of a user space, in accordance with one or more embodiments of the present disclosure. As described previously herein, physical and/or electrical characteristics of backplates 102 and associated swappable device units 202 may vary based on functionality.

Accordingly, innovative concepts disclosed herein with regard to the backplate 102 and swappable device unit 202 illustrated in FIGS. 3 and 4, FIGS. 5A and 5B may apply to and may otherwise be utilized to provide various combinations of physical shapes, mounting configurations, wired and/or wireless connections between a backplate 102 and building services 104 (e.g., mains power, plumbing systems, HVAC systems, or the like), wired and/or wireless data communication between a backplate 102 and a swappable device unit 202. Further, backplates 102 and swappable device units 202 may be, but are not required to be coupled as generally described in U.S. patent application Ser. Nos. 15/253,811, 15/253,815, 15/253,819, 15/756,510, 15/145, 624, 15/074,915, International Application No. PCT/US2016/049797, and U.S. Provisional Application No. 62/212,388, which are incorporated herein in their entirety.

In some embodiments, a swappable device unit 202 includes connected lighting devices. For example, a swappable device unit 202 may include a light fixture 606 suitable for powering luminaires (e.g. a flush-mount light fixture, a chandelier, or a pendant light, or the like) and having a base suitable for removably coupling with a corresponding backplate 102 mounted within the ceiling. In this regard, a series of backplates 102 suitable for physically coupling with light fixtures 606 and connected to building services 104 (e.g. mains power, a communication network, or the like) may be distributed throughout the user space. A user may thus replace, upgrade, or rearrange light fixtures 606 throughout the user space by decoupling a current light fixture 606 from a backplate 102 and coupling a new light fixture 606 to the backplate 102. For example, a user may replace light fixture 606a in the first room 602 with light fixture 606b in the second room 604.

Accordingly, a newly installed light fixture 606 may self-configure by receiving configuration information from the backplate 102 (e.g. protocols to join a modular device network 200), broadcasting relevant information to other swappable device units 202 on the modular device network 200 (e.g. lighting controllers), and/or enabling remote control of attached luminaires. In some embodiments, the associated backplate 102 is configured to allow the user to remove and replace light fixtures 606 with the corresponding backplates 102 connected to "live" power.

In some embodiments, a swappable device unit 202 includes a ceiling fan (not shown). For example, a ceiling fan may be configured to mount to a backplate 102 suitable for coupling with light fixtures 606 as previously described herein. Accordingly, a user may replace light fixture 606a with a ceiling fan (with or without luminaires) by decoupling the light fixture 606a from the backplate 102 and coupling a new ceiling fan to the backplate 102. Accordingly, the newly installed ceiling fan may self-configure (e.g. connect to a modular device network 200, broadcast capabilities (e.g. available fan speeds, or the like) to the modular device network 200, and enable remote control over the modular device network 200.

In some embodiments, a swappable device unit 202 includes an electrical outlet 608 for receiving electrical loads through a typical electrical plug. For example, a series of backplates 102 suitable for physically coupling with electrical outlets and connected to building services 104 (e.g. mains power, a communication network, or the like) may be distributed throughout the user space. An electrical outlet 608 may thus be replaced, upgraded, or rearranged throughout the user space by decoupling a current electrical outlet 608 (e.g. one without "smart" control functionality) from a backplate 102 and coupling a new electrical outlet 608 to the backplate 102 (e.g. one with "smart" control functionality). Accordingly, the newly installed electrical outlet 608 may self-configure by performing functions such as, but not limited to, connecting to a modular device network 200, broadcasting capabilities (e.g. number of outlets, power ratings, or the like) to the modular device network 200, and enabling remote control over the modular device network 200.

In some embodiments, a swappable device unit 202 includes a thermostat 610. For example, a backplate 102 suitable for physically coupling with thermostats (e.g. physically and/or communicatively) may be connected to HVAC system wiring. A thermostat 610 may thus be replaced, upgraded, or rearranged throughout the user space by decoupling a current thermostat 610 (e.g. one without "smart" control functionality) from a backplate 102 and coupling a new thermostat 610 to the backplate 102 (e.g. one with "smart" control functionality) without requiring the user or a qualified technician to wire the new thermostat 610. Accordingly, the newly installed thermostat 610 may self-configure by performing functions such as, but not limited to, connecting to a modular device network 200, broadcasting capabilities (e.g. current temperatures, set temperatures, number of zones, or the like) to the modular device network 200, and enabling remote control over the modular device network 200.

In some embodiments, a swappable device unit 202 includes a vent 612 (e.g. a vent coupled to HVAC ducts throughout a user space). For example, a series of backplates 102 suitable for physically coupling with vents and connected to building services 104 (e.g. mains power, a communication network, or the like) may be distributed throughout the user space. A vent 612 may thus be replaced, upgraded, or rearranged throughout the user space by decoupling a current vent 612 (e.g. one without "smart" control functionality of air flow through the vent 612) from a backplate 102 and coupling a new vent 612 to the backplate 102 (e.g. one with "smart" control functionality of air flow through the vent 612). Accordingly, the newly installed vent 612 may self-configure by performing functions such as, but not limited to, connecting to a modular device network 200, broadcasting capabilities (e.g. range of possible air flows, range of motion of air-control flaps, or the like) to the modular device network 200, and enabling remote control over the modular device network 200.

In some embodiments, a swappable device unit 202 includes blinds 614 (e.g. window blinds, door blinds, shades, or the like). For example, a series of backplates 102 suitable for physically coupling with blinds and connected to building services 104 (e.g. mains power, a communication network, or the like) may be distributed throughout the user space. Accordingly, blinds 614 may be replaced, upgraded, or rearranged throughout the user space by decoupling current blinds 614 (e.g. one without "smart" control functionality) from a backplate 102 and coupling new blinds 614 to the backplate 102 (e.g. one with "smart" control functionality). Accordingly, the newly installed blinds 614 may self-configure by performing functions such as, but not limited to, connecting to a modular device network 200, broadcasting capabilities (e.g. range of possible open/close settings, range of transmitted light levels, or the like) to the modular device network 200, and enabling remote control over the modular device network 200.

In some embodiments, as illustrated in FIG. 6B, a swappable device unit 202 may include a complete assembly of blinds 614. In this regard, a user may interchangeably swap out complete assemblies of blinds 614 having different functionality (e.g., manual control, remote control, or the like) and/or different aesthetics.

In some embodiments, a backplate 102 for blinds 614 includes mechanical components suitable for operating (e.g., raising, lowering, opening, closing, or the like) a light-controlling feature 614a (e.g., a rollable shade, slats of material suspended from string, or the like). In this regard, a swappable device unit 202 may include one or more components of the blinds 614. For example, the swappable device unit 202 may include the light-controlling feature 614a. In this regard, a user may interchange the aesthetics and/or type of light-controlling system. By way of another example, the swappable device unit 202 may include a control unit for providing manual and/or remote control of the light-controlling feature 614a.

Figure 7A:
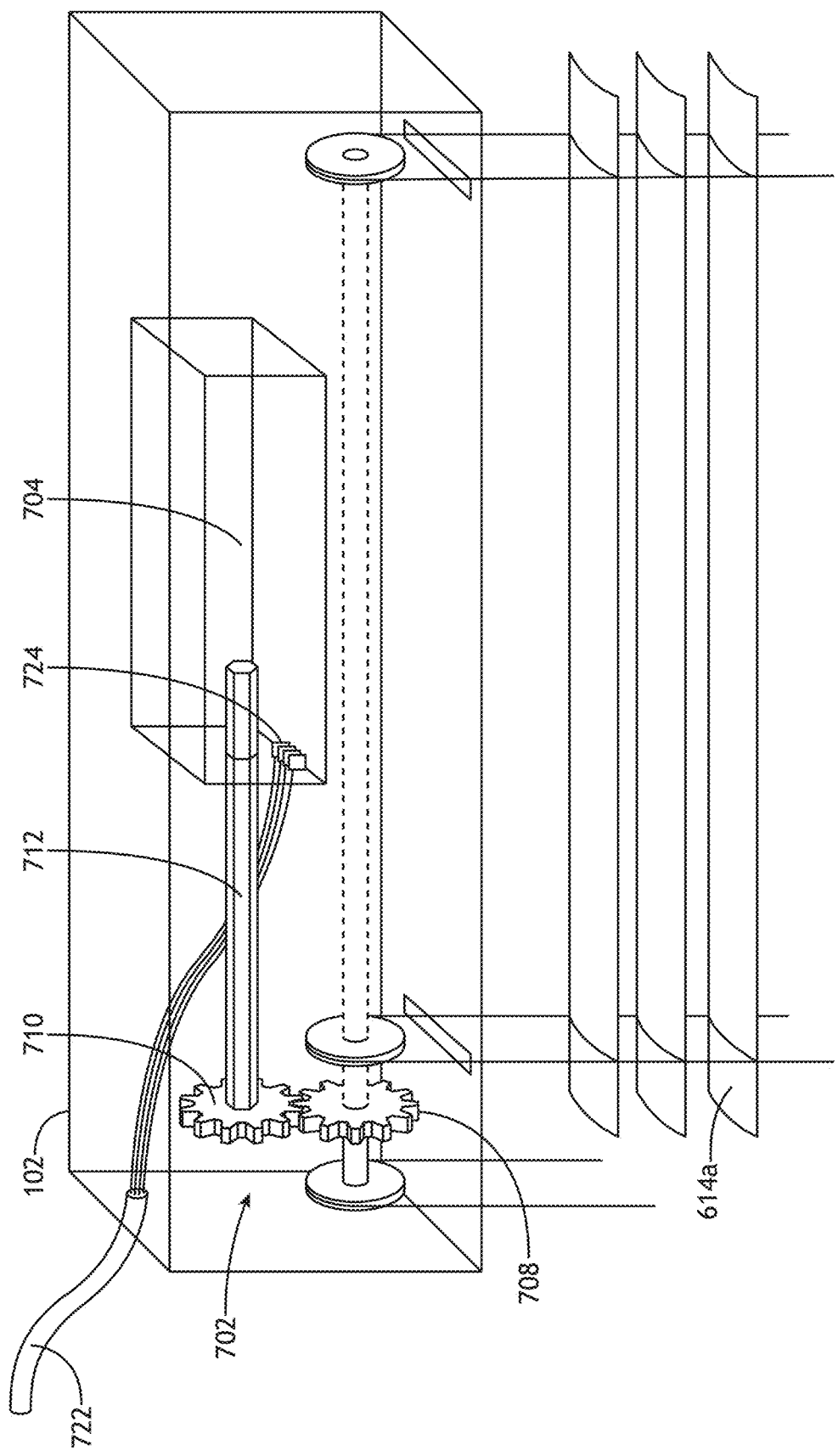
FIG. 7A is a conceptual view of a backplate for blinds including a gear system for operating the light-controlling feature and a cavity for accepting a swappable device unit configured as a control unit, in accordance with one or more embodiments of the present disclosure.

FIG. 7A is a conceptual view of a backplate 102 for blinds 614 including a gear system 702 for operating the light-controlling feature 614a and a cavity 704 for accepting a swappable device unit 202 configured as a control unit 706, in accordance with one or more embodiments of the present disclosure. In some embodiments, the gear system 702 includes one or more primary gears 708 coupled to the light-controlling feature 614a to provide operational functionality and one or more auxiliary gears 710 suitable for coupling to a swappable device unit 202 to provide control of the primary gears 708 and thus control over the light-controlling feature 614a. For example, as illustrated in FIG. 7A, the backplate 102 may include a coupling shaft 712 (e.g., a hex shaft, or the like) coupled to the auxiliary gears 710 that extends into the cavity 704 to couple to an inserted control unit 706. In this regard, the control unit 706, operating on the coupling shaft 712, may engage the primary gears 708 and thus provide operational control over the light-controlling feature 614a.

The control unit 706 may provide any desired level of remote and/or automated control of the light-controlling feature 614a. For example, the control unit 706 may facilitate user control of the light-controlling feature 614a through voice commands, a phone application or the like. By way of another example, the control unit 706 may include one or more sensors (e.g., light-level sensors, temperature sensors, or the like) to provide feedback and/or sensor-based automated control. Further, the control unit 706 may connect to one or more additional devices (e.g., on the modular device network 200 or an external system) to provide integrated functionality within the additional systems. In this regard, the control unit 706 may integrated with additional devices (e.g., external sensors, external energy monitors, or the like) to provide automated (e.g., algorithmic) control. Accordingly, the control unit 706 may adjust the light-controlling feature 614a based on any combination of external inputs such as, but not limited to, measured light level, measured temperature level, or measured energy usage (e.g., of the user space, of a building, or the like).

Figure 7B:
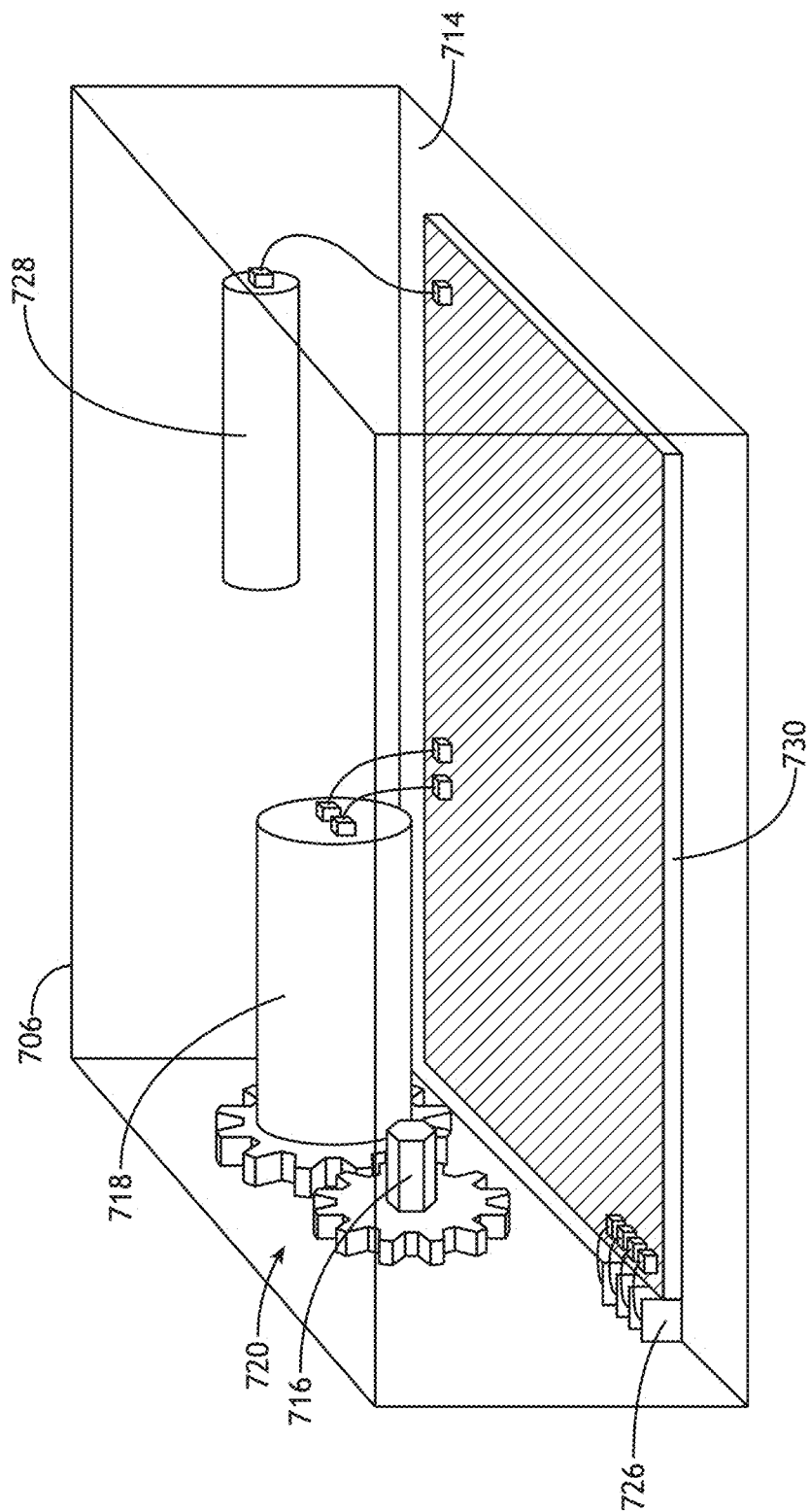
FIG. 7B is a conceptual view of a control unit, in accordance with one or more embodiments of the present disclosure.

FIG. 7B is a conceptual view of a control unit 706, in accordance with one or more embodiments of the present disclosure. In some embodiments, the control unit 706 includes a casing 714 configured to fit within the cavity 704. In some embodiments, the control unit 706 includes a control shaft receptor 716 suitable for coupling with the coupling shaft 712 and a motor 718 for driving the control shaft receptor 716. In this regard, the motor 718, operating on the control shaft receptor 716, may control the coupling shaft 712 to operate the light-controlling feature 614*a* as described previously herein.

The motor 718 may operate on the control shaft receptor 716 using any technique known in the art. For example, as illustrated in FIG. 7B, the control unit 706 may include drive gears 720 coupling the motor 718 and the control shaft receptor 716. By way of another example, though not shown, the motor 718 may directly couple with the control shaft receptor 716.

The control unit 706 may be powered by any power source known in the art. In some embodiments, as shown in FIGS. 7A and 7B, the backplate 102 is connected to electrical mains power (e.g., building services 104) through electrical wiring 722 and further includes electrical contacts 724 suitable for providing a wired power connection to the control unit 706. For example, the control unit 706 may include corresponding electrical contacts 726 configured to interface with the electrical contacts 724 of the backplate 102. In some embodiments, the control unit 706 includes a battery 728. Further, the battery 728 may operate as the primary power source (e.g., in a case where the backplate 102 is not connected to electrical mains power) or may serve as a backup battery source.

In some embodiments, the control unit 706 includes control circuitry 730 to perform various functions. For example, the control circuitry 730 may include motor drive circuitry suitable for driving the motor 718. By way of another example, the control circuitry 730 includes power regulation circuitry (e.g., converters, regulators, or the like) to regulate power from a power source (e.g., electrical mains power from the backplate 102, power from the battery 728, or the like). By way of another example, the control circuitry 730 includes wired and/or wireless communications circuitry such as, but not limited to, one or more transmitters or one or more receivers. In this regard, the control unit 706 may establish and/or maintain communication with additional swappable device units 202 in the modular device network 200 and/or external systems.

In some embodiments, the backplate 102 includes one or more covers (not shown). For example, the backplate 102 may include a cover for the cavity 704. Further, the covers may provide any combination of aesthetic or safety functionality.

In some embodiments, the backplate 102 includes one or more manual operation cords 732 for manually operating the light-controlling feature 614*a*. For example, the manual operation cords 732 may be permanently integrated within the backplate 102 to provide manual operation regardless of whether a control unit 706 (e.g., for remote-control and/or automated functionality) is installed. By way of another example, though not shown, the manual operation cords 732 may be provided as a swappable device unit 202. In one instance, the backplate 102 may include an additional coupling shaft 712 coupled to auxiliary gears 710 and extending into an additional cavity. Accordingly, a swappable device unit 202 including manual operation cords 732 may be optionally and/or interchangeably inserted to provide manual control.

In some embodiments, a swappable device unit 202 includes a lock 616 (e.g. a door lock, a window lock, a cabinet lock or the like). For example, a series of backplates 102 suitable for physically and/or communicatively coupling with locks and connected to building services 104 (e.g. mains power, a communication network, or the like) may be distributed throughout the user space (e.g. in or near door frames as illustrated in FIG. 6A, in or near window frames, in cabinets, or the like). A lock 616 may thus be replaced, upgraded, or rearranged throughout the user space by decoupling a current lock 616 (e.g. one without "smart" control functionality) from a backplate 102 and coupling a new vent 612 to the backplate 102 (e.g. one with "smart" control functionality of air flow through the vent 612). Accordingly, the newly installed vent 612 may self-configure by performing functions such as, but not limited to, connecting to a modular device network 200, broadcasting capabilities (e.g. a current lock/unlock state) to the modular device network 200, and enabling remote control over the modular device network 200.

In some embodiments, a swappable device unit 202 includes a door opener 618 (e.g. door openers for sliding doors, hinged interior or exterior doors, cabinet doors, or the like). For example, a series of backplates 102 suitable for physically and/or communicatively coupling with door openers and connected to building services 104 (e.g. mains power, a communication network, or the like) may be distributed throughout the user space (e.g. in or near door frames as illustrated in FIG. 6A, in or near window frames, in cabinets, or the like). An door opener 618 may thus be installed, replaced, upgraded, or rearranged throughout the user space by decoupling a current door opener 618 (e.g. hinges and associated hardware without "smart" control functionality) from a backplate 102 and coupling a new door opener 618 to the backplate 102 (e.g. one with "smart" control functionality to allow remote opening or closing of doors). Accordingly, the newly installed vent 612 may self-configure by performing functions such as, but not limited to, connecting to a modular device network 200, broadcasting capabilities (e.g. a current lock/unlock state) to the modular device network 200, and enabling remote control over the modular device network 200.

In some embodiments, a swappable device unit 202 includes a sensor 620 (a camera, a microphone, a door sensor, a window sensor, an occupancy sensor, a light-level sensor, a thermometer, an air quality sensor, a water flow sensor in a plumbing system, or the like). For example, a series of backplates 102 suitable for physically and/or communicatively coupling with sensors and connected to building services 104 (e.g. mains power, a communication network, or the like) may be distributed throughout the user space (e.g. in or near window frames as illustrated in FIG. 6B, in or near door frames, in cabinets, in plumbing fixtures, or the like). An sensor 620 may thus be installed, replaced, upgraded, or rearranged throughout the user space by decoupling a current sensor 620 (if installed) from a backplate 102 and coupling a new sensor 620 to the backplate 102 (e.g. one with "smart" control functionality to automatically open). Accordingly, the newly installed vent 612 may self-configure by performing functions such as, but not limited to, connecting to a modular device network 200, broadcasting capabilities (e.g. a current lock/unlock state) to the modular device network 200, and enabling remote control over the modular device network 200. In some embodiments, a backplate 102 suitable for coupling to a sensor 620 is installed behind a portion of a wall or ceiling and includes a magnet for mounting a sensor 620 if desired. It is contemplated herein that such a magnetic mount may facilitate easy installation/removal of sensors with varying form factors throughout the living space as desired.

In some embodiments, a swappable device unit 202 includes a smoke detector 622. For example, a series of backplates 102 suitable for physically and/or communicatively coupling with smoke detectors and connected to building services 104 (e.g. mains power, a communication network, or the like) may be distributed throughout the user space. A smoke detector 622 may thus be replaced, upgraded, or rearranged throughout the user space by decoupling a current smoke detector 622 (e.g. one with a minimal feature set) from a backplate 102 and coupling a new vent 612 to the backplate 102 (e.g. one with an enhanced feature set such as, but not limited to alarms, mobile notifications, network compatibility, or the like). Accordingly, the newly installed vent 612 may self-configure by performing functions such as, but not limited to, connecting to a modular device network 200, broadcasting capabilities (e.g. smoke levels, air quality measurements, carbon monoxide levels, or the like) to the modular device network 200, and enabling data access over the modular device network 200.

In some embodiments, a swappable device unit 202 includes plumbing control devices in a plumbing system such as, but not limited to, regulators, shut-off valves, pressure sensors, or the like. Plumbing control devices may be utilized for any type of plumbing system known in the art such as, but not limited to, water systems or natural gas systems. For example, one or more backplates 102 suitable for physically and/or communicatively coupling with a plumbing system and connected to building services 104 (e.g. mains power, a communication network, or the like) may be distributed throughout the user space. A plumbing control device may thus be replaced, upgraded, or rearranged throughout the user space by decoupling a current plumbing control device (e.g. one with a minimal feature set such as, but not limited to, a manual handle) from a backplate 102 and coupling a new plumbing control device to the backplate 102 (e.g. one with an enhanced feature set such as, but not limited to, network compatibility, remote control functionality, or the like). For example, an enhanced water control device may regulate water use and/or pressure for different portions of the house such that a water control device located on a pipe leading to a shower may provide higher pressure than an additional water control device on a pipe near a dishwasher. Accordingly, the newly installed water control device may self-configure by performing functions such as, but not limited to, connecting to a modular device network 200, broadcasting capabilities (e.g. water pressure, water flow rates, water usage, or the like) to the modular device network 200, and enabling data access over the modular device network 200.

Figure 8A:
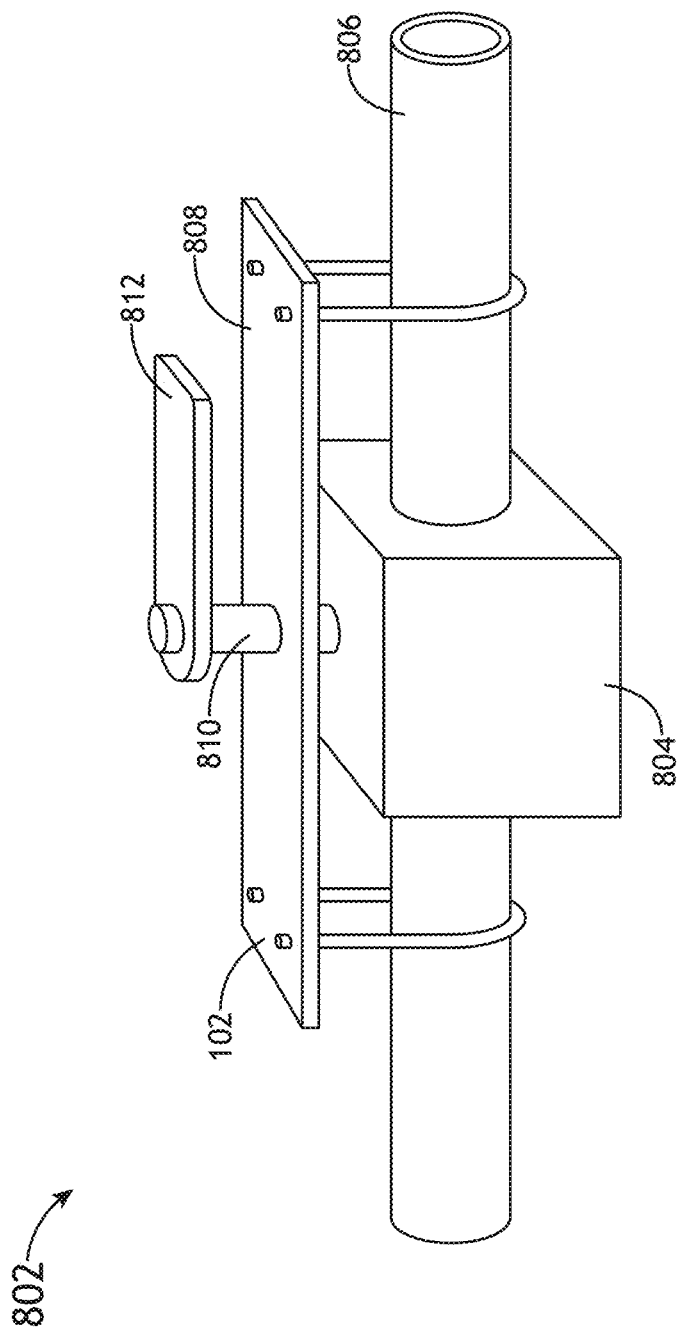
FIG. 8A is a conceptual view of a backplate for a plumbing valve, in accordance with one or more embodiments of the present disclosure.

FIG. 8A is a conceptual view of a backplate 102 for a plumbing valve 802, in accordance with one or more embodiments of the present disclosure. In some embodiments, the backplate 102 includes a mechanical valve 804 for regulating flow through a pipe 806. The pipe 806 may be any type of pipe known in the art and may be suitable for controlling the flow of any substance (e.g., a water, a natural gas, or the like). Further, the backplate 102 may include a mount 808 affixed to the pipe 806 for accepting a swappable device unit 202. For example, as illustrated in FIG. 8A, the mount 808 may affix to a portion of the pipe 806 and provide a stable surface such as, but not limited to, a plate suitable for receiving swappable device units 202. Further, though not shown, the mount 808 may include one or more locking mechanisms (e.g., snaps, tabs, or the like) suitable for connecting with corresponding locking mechanisms on the swappable device units 202 to secure the swappable device units 202 in place.

In some embodiments, the mechanical valve 804 includes a control shaft 810 (e.g., a hex shaft) suitable for control of the operation of the mechanical valve 804 and thus the flow through the pipe 806. Further, as illustrated in FIG. 8A, the backplate 102 may include a manual valve handle 812 suitable for providing a user with manual control of the mechanical valve 804.

In some embodiments, the swappable device units 202 configured as the plumbing valve 802 includes components for coupling with and controlling the mechanical valve 804 (e.g., via the control shaft 810). In this regard, the swappable device units 202 may provide additional functionality and/or control with respect to the operation of the mechanical valve 804.

Figure 8B:
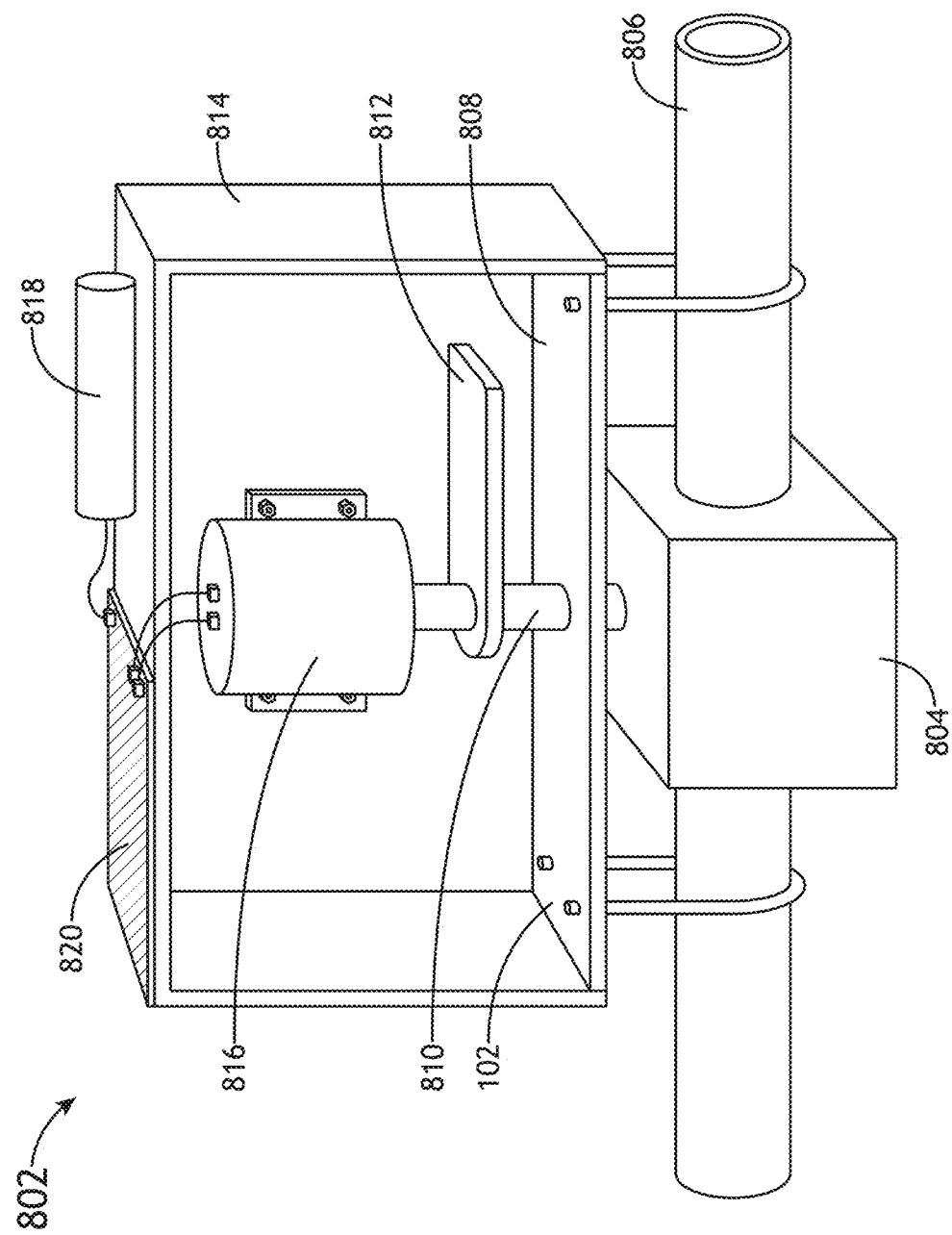
FIG. 8B is a conceptual view of a swappable device unit associated with a plumbing valve mounted onto a backplate affixed to a pipe, in accordance with one or more embodiments of the present disclosure.

FIG. 8B is a conceptual view of a swappable device unit 202 associated with a plumbing valve 802 mounted onto a backplate 102 affixed to a pipe, in accordance with one or more embodiments of the present disclosure. In some embodiments, the swappable device unit 202 includes a casing 814 designed to attach to the mount 808. In some embodiments, the swappable device unit 202 includes a motor 816 for driving the control shaft 810. In this regard, the motor 816, operating on the control shaft 810, may control the coupling shaft 712 to operate the mechanical valve 804 as described previously herein.

The motor 816 may operate on the control shaft receptor 716 using any technique known in the art. For example, as illustrated in FIG. 8B, the motor 816 may directly couple with the control shaft 810. By way of another example, though not shown, the swappable device unit 202 may include drive gears for coupling the motor 816 and the control shaft 810.

Further, it may be desirable to provide access to the manual valve handle 812 to allow for manual control of the mechanical valve 804 in additional to control via the swappable device unit 202 (e.g., as a manual override). Accordingly, the swappable device unit 202 may provide an opening (e.g., an access port, or the like) for user access to the manual valve handle 812. Alternatively, it may be desirable to restrict manual access. Accordingly, the swappable device unit 202 may limit user access to the manual valve handle 812.

The swappable device unit 202 may be powered by any power source known in the art. In some embodiments, the backplate 102 may be connected to electrical mains power (e.g., building services 104) through electrical wiring and/or a battery and may further include electrical contacts to couple the power to the swappable device unit 202. For example, in an area where electrical mains power is not readily available or undesirable, a battery may power the configuration storage device 110 used to provide configuration information to swappable device units 202 as described previously herein. In some embodiments, as shown in FIG. 8B, the swappable device unit 202 includes a battery 818 to provide power.

In some embodiments, the swappable device unit 202 includes control circuitry 820 to perform various functions. For example, the control circuitry 820 may include motor drive circuitry suitable for driving the motor 816. By way of another example, the control circuitry 820 includes power regulation circuitry (e.g., converters, regulators, or the like) to regulate power from a power source (e.g., electrical mains power from the backplate 102, power from the battery 818, or the like). By way of another example, the control circuitry 820 includes wired and/or wireless communications circuitry such as, but not limited to, one or more transmitters or one or more receivers. In this regard, the swappable device unit 202 may establish and/or maintain communication with additional swappable device units 202 in the modular device network 200 and/or external systems.

In some embodiments, the backplate 102 and/or the swappable device unit 202 includes one or more covers (not shown). For example, the backplate 102 may include a cover for the cavity 704. Further, the covers may provide any combination of aesthetic or safety functionality.

In some embodiments, the backplate 102 includes one or more integrated sensors (pressure sensors, flow sensors, etc) to facilitate feedback, automation and/or algorithmic control of the mechanical valve 804. In some embodiments, the swappable device unit 202 may connect to one or more additional devices (e.g., on the modular device network 200 or an external system) to provide integrated functionality within the additional systems. In this regard, the swappable device unit 202 may be integrated with additional devices (e.g., external sensors, external energy monitors, a mobile device, or the like) to provide automated (e.g., algorithmic) control based on inputs from multiple sources (e.g., additional pipes distributed throughout the user space). In some embodiments, the swappable device unit 202 may be connected to a mobile device either directly or through the modular device network 200 to provide direct user control. In some embodiments, the swappable device unit 202 adjusts the mechanical valve 804 based on any combination of external inputs such as, but not limited to, measured flow rates, measured temperature levels, or the like.

For example, an algorithm to control the amount of water flowing to different appliances or features of a user space (e.g., a house, a commercial building, or the like) may measure the water pressure and flow at different points of the house using one or more sensors (e.g., one or more sensors incorporated into the modular device network 200) and pre-defined prioritization of the activities. For example, appliances and features throughout the user space may been given a priority (e.g., High and Low, a number between 1 and 5, or the like). In one instance, considering priority levels of High and Low, all showers and sinks may be set to High priority and all other appliances set to Low priority. Accordingly, an algorithm may be set such that if a user is using the shower and a dishwasher appliance starts taking water, as determined by flow or pressure sensors, and if it is determined that the pressure in the shower is below a pressure threshold, the connected water control unit that is controlling the dishwasher will restrict the flow of water until the pressure at the shower is above the pressure threshold. Further, when the flow sensor at the shower indicates the shower is over, the water control device for the dishwasher. It is to be understood however, that the above example is provided solely for illustrative purposes and should not be interpreted as limiting.

In some embodiments, a swappable device unit 202 includes a device control assembly suitable for controlling and/or managing the modular device network 200 associated with the modular device backbone 100. For example, a device control assembly may provide a user interface (e.g. a display, a voice management interface, a haptic control interface, or the like) for the control of loads 108 connected to any swappable device unit 202. By way of another example, a device control assembly may provide an interface for a user to manage and/or reconfigure one or more swappable device units 202 and/or configuration parameters. In this regard, a device control assembly may directly or indirectly modify configuration information stored in the configuration storage device 110 of a backplate 102.

A device control assembly may be configured to couple to any type of backplate 102 of the modular device backbone 100 such as, but not limited to, a backplate 102 having a form factor suitable for mounting to an electrical junction box on a wall. In this regard a device control assembly may have a form factor of a lighting control device (e.g. a switch, a dimmer, or the like).

Figure 9:
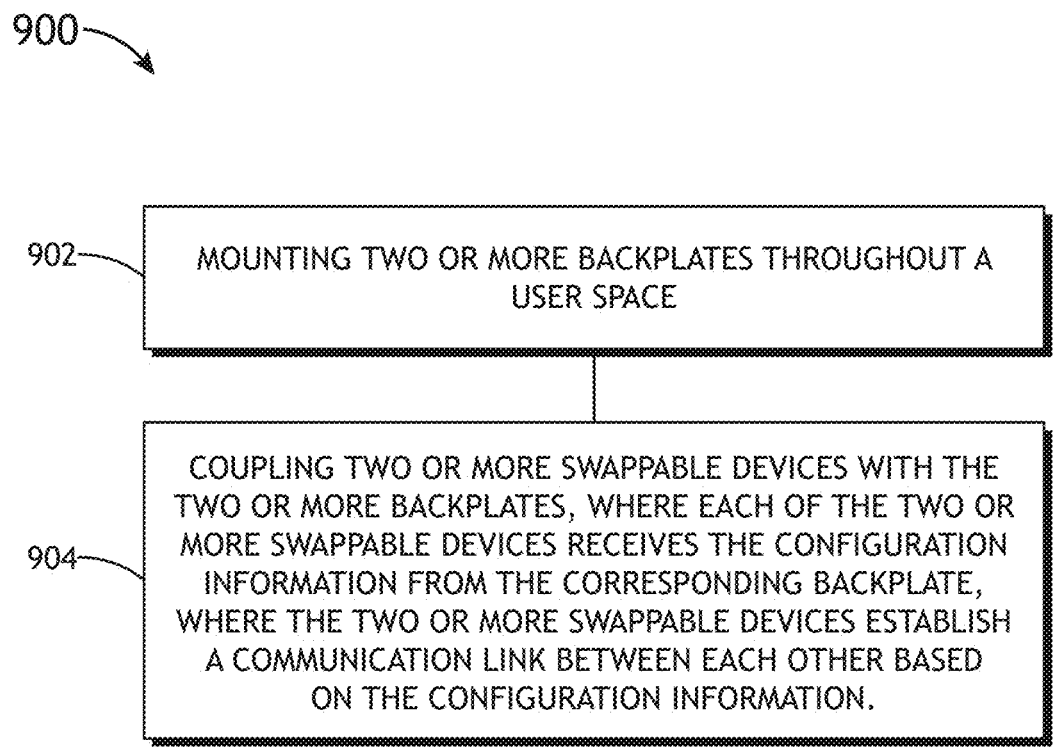
FIG. 9 is a flow diagram illustrating steps performed in a method for providing a modular device network, in accordance with one or more embodiments of the present disclosure.

FIG. 9 is a flow diagram illustrating steps performed in a method 900 for providing a modular device network, in accordance with one or more embodiments of the present disclosure. Applicant notes that the embodiments and enabling technologies described previously herein in the context of modular device network 200 should be interpreted to extend to method 900. It is further noted, however, that the method 900 is not limited to the architecture of modular device network 200.

In one embodiment, the method 900 includes a step 902 of mounting two or more backplates (e.g., backplates 102) throughout a user space. In this regard, the two or more backplates may be configured to couple with any of a plurality of swappable devices. In some embodiments, each of the one or more backplates includes a configuration storage device to store configuration information for communicating with additional swappable devices coupled to additional backplates, and a communication unit to provide the configuration information to a coupled swappable device.

In another embodiment, the method 900 includes a step 904 of coupling two or more swappable devices of the plurality of swappable devices with the two or more backplates. In this regard, each of the two or more swappable devices may receive the configuration information from the corresponding backplate, wherein the two or more swappable devices establish a communication link between each other based on the configuration information.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A modular device backbone comprising:
   a controller;
   two or more backplates configured to be distributed throughout a user space and further configured to couple with any of a plurality of swappable devices, wherein each of the two or more backplates comprises:
      a configuration storage device to store backplate-based configuration information including a backplate identifier and further including information for communicating with the controller; and
      a communication unit to transmit the backplate-based configuration information,
      wherein, upon coupling of a particular swappable device of the plurality of swappable devices to a particular backplate of the two or more backplates,
   the particular swappable device receives configuration information including the backplate-based configuration information from the particular backplate and controller-based configuration information associated with the backplate identifier from the controller,
   wherein the configuration information includes information for communicating with additional swappable devices of the plurality of swappable devices and a location of the particular backplate in the user space,
   wherein the particular swappable device self-configures location-based functionality based on the location,
   wherein the coupled swappable device establishes a communication link to the additional swappable devices based on the configuration information.

2. The modular device backbone of claim 1, wherein the controller comprises:
   at least one of a hub, a local server, or a remote server.

3. The modular device backbone of claim 1, wherein the configuration information further includes a list of the additional swappable devices coupled to the additional backplates.

4. The modular device backbone of claim 3, wherein the two or more backplates include an electrical backplate configured to be connected to a power distribution panel via electrical wiring throughout the user space.

5. The modular device backbone of claim 4, wherein the electrical backplate is configured to couple with any of a set of the plurality of swappable devices including electrical loads and further provide connections to the power distribution panel upon coupling.

6. The modular device backbone of claim 5, wherein the electrical loads comprise:
   at least one of a luminaire, a fan, an outlet, or a sensor.

7. The modular device backbone of claim 5, wherein the electrical loads comprise:
   at least one of, an air vent, window blinds, a door lock, or a door opener.

8. The modular device backbone of claim 4, wherein the electrical backplate is configured to couple with any of a set of the plurality of swappable devices including electrical load controllers and further provide connections to the power distribution panel at least one electrical load upon coupling.

9. The modular device backbone of claim 8, wherein at least one of the electrical load controllers comprises:
   a switch to toggle power from the power distribution panel to the at least one electrical load between a powered state and an unpowered state.

10. The modular device backbone of claim 8, wherein at least one of the electrical load controllers comprises:
    a dimmer to regulate power from the power distribution panel to the at least one electrical load.

11. The modular device backbone of claim 8, wherein at least one of the electrical load controllers comprises:
    a control panel to regulate power from the power distribution panel to the at least one electrical load according to user-selected values.

12. The modular device backbone of claim 1, wherein the two or more backplates include a thermostat backplate configured to be connected to a HVAC system, wherein the thermostat backplate is configured to couple to a set of swappable devices of the plurality of swappable devices including thermostat control units and further configured to provide connections to the HVAC system upon coupling.

13. The modular device backbone of claim 1, wherein the two or more backplates include a plumbing backplate configured to be connected to a plumbing system, wherein the plumbing backplate is configured to couple to a set of swappable devices of the plurality of swappable devices including plumbing fixtures and further configured to provide connections to the plumbing system upon coupling.

14. A modular device network comprising:
    a controller;
    two or more backplates distributed throughout a user space and configured to couple with any of a plurality of swappable devices, wherein each of the two or more backplates comprises:
       a configuration storage device to store backplate-based configuration information including a backplate identifier and further including information for communicating with the controller;
       and a communication unit to transmit the backplate-based configuration information; and
    two or more swappable devices of the plurality of swappable devices coupled to the two or more backplates,
    wherein, upon coupling of a particular swappable device of the two or more swappable devices to a particular backplate of the two or more backplates,
    the particular swappable device receives configuration information including the backplate-based configuration information from the particular backplate and controller-based configuration information associated with the backplate identifier from the controller,
    wherein the configuration information includes information for communicating with additional swappable devices of the plurality of swappable devices and a location of the particular backplate in the user space,
    wherein the particular swappable device self-configures location-based functionality based on the location,
    wherein the two or more swappable devices establish a communication link between each other based on the configuration information.

15. The modular device network of claim 14, wherein the controller comprises:
    at least one of a hub, a local server, or a remote server.

16. The modular device network of claim 14, wherein the configuration information further includes a location of the corresponding backplate within the user space, wherein each of the two or more coupled swappable devices self-configures location-based functionality based on the location.

17. The modular device network of claim 14, wherein the configuration information further includes a list of the additional swappable devices coupled to the additional backplates.

18. A method for providing a modular device network comprising:
  mounting two or more backplates throughout a user space, wherein the two or more backplates are configured to couple with any of a plurality of swappable devices, wherein each of the two or more backplates comprises:
    a configuration storage device to store backplate-based configuration information including a backplate identifier and further including information for communicating with a controller; and
    a communication unit to transmit the configuration information; and
  coupling two or more swappable devices of the plurality of swappable devices with the two or more backplates, wherein, upon coupling of a particular swappable device of the two or more swappable devices to a particular backplate of the two or more backplates,
  the particular swappable device receives configuration information including the backplate-based configuration information from the particular backplate and controller-based configuration information associated with the backplate identifier from the controller,
  wherein the configuration information includes information for communicating with additional swappable devices of the plurality of swappable devices and a location of the particular backplate in the user space,
  wherein the particular swappable device self-configures location-based functionality based on the location,
  wherein the two or more swappable devices establish a communication link between each other based on the configuration information.

* * * * *